United States Patent [19]

Maierson et al.

[11] 3,769,045

[45] Oct. 30, 1973

[54] PROCESS FOR PRODUCING LIQUID WRITE CRAYON

[75] Inventors: Theodore Maierson; Edward M. Powers; Thomas J. Bowles, all of Dayton, Ohio

[73] Assignee: The National Cash Register Company, Dayton, Ohio

[22] Filed: June 22, 1971

[21] Appl. No.: 155,658

[52] U.S. Cl.................... 106/19, 106/21, 106/31, 106/272
[51] Int. Cl. ...................... C09d 13/00, C09d 11/00
[58] Field of Search ............... 106/19–32, 270–271, 14.5; 117/1.5, 15, 1.7; 18/28; 401/49

[56] References Cited
UNITED STATES PATENTS

| | | | |
|---|---|---|---|
| 1,230,149 | 6/1917 | Geer | 106/19 |
| 3,016,308 | 1/1962 | Macauley | 106/31 X |

FOREIGN PATENTS OR APPLICATIONS

| | | | |
|---|---|---|---|
| 670,867 | 4/1952 | Great Britain | 106/19 |

Primary Examiner—Joseph L. Schofer
Assistant Examiner—Joan B. Evans
Attorney—E. Frank McKinney et al.

[57] ABSTRACT

A liquid write crayon is disclosed. The crayon comprises a mixture of at least one wax and encapsulated marking liquid. This crayon contains a large amount of the encapsulated marking liquid and yet maintains a proper balance of fluidity, lubricity and strength. The crayon is produced by a combination of steps which include dry blending, light pressure and mild heating.

1 Claim, No Drawings

PROCESS FOR PRODUCING LIQUID WRITE CRAYON

This invention relates to a liquid marking crayon and to a process for producing the liquid marking crayon.

Conventional wax crayons and processes for producing wax crayons are known in the art. For example, see U.S. Pat. No. 1,230,149. Conventional wax crayons generally contain large amounts of wax and depend on rigidity and severe friction for marking. Often, an abrasive substance such as pumice-stone is admixed with the wax and marking liquid. Conventional processes for producing such crayons usually require heating at high temperatures for long periods of time.

A low wax content crayon now has been found which approaches the desirable fluid marking properties of felt-tip markers, while maintaining the desirable rigid qualities of wax crayons. A feature of this crayon is the presence of the large amount of encapsulated marking fluid. This crayon is produced by a combination of steps which includes dry blending and mild heating under pressure. The crayon of this invention is a product which has the proper balance of fluidity, lubricity and strength.

Accordingly, an object of this invention is to provide a liquid marking crayon.

Another object of this invention is to provide a process for producing a liquid marking crayon.

Other objects, aspects and advantages of this invention will be apparent to one skilled in the art from the following disclosure and appended claims.

The ingredients for producing the crayon of this invention are wax and encapsulated marking liquid. The crayon of this invention generally contains 20 to 40 weight percent wax and 60 to 80 weight percent encapsulated marking liquid. Preferably, these amounts are 25 to 35 weight percent wax and 65 to 75 weight percent encapsulated marking liquid.

The wax can vary widely. Vegetable, animal, petroleum, natural and synthetic waxes, all can be employed in this invention. Mixtures of these waxes also can be employed. These waxes include high molecular-weight acids, alcohols, esters, saturated hydrocarbons, hydrogenated fatty acids, branched chain hydrocarbon waxes, long chain paraffins and the like, and mixtures thereof. Three well known examples are carnauba, montan and beeswax.

The encapsulated marking liquid comprises a capsule having walls at least partially consisting of hydrophilic colloid material and a core material of marking liquid. The material or materials chosen as the wall material of the capsule is inert with respect to the contents of the capsule so that the wall material stays intact under normal storage conditions. An example of wall material is gelatin alone or in combination with gum arabic.

Many other hydrophilic colloid materials are described in U.S. Pat. Nos. 2,712,507; 2,730,457; 2,800,457; 2,800,458 and Reissue U.S. Pat. No. 24,899. Capsule wall material also is described in U.S. Pat. application Ser. No. 44,805, filed June 9, 1970. These patents and patent application also disclose various colorless, but colorable marking liquids and processes for the manufacture of capsules containing such marking liquid or any water-immiscible liquid.

The marking liquid is any liquid dye or ink. If desired, the marking liquid can be colorless, but colorable. The latter alternative is employed if the substrate to be marked is coated with acidic mark-forming materials such as kaolin, attapulgite, silica gel, zeolite, phenol polymers, maleic acid-rosin resins, and the like. Examples of colorless but colorable marking liquids are 3,3-bis(4-dimethylaminophenyl)-6-dimethylaminophthalide, 3,7-bis(dimethylamino)-10-benzoyl phenothiazine and 2'-anilino-6'-diethylamino-3'-methylfluoran.

Any liquid ink or dye can be the marking liquid of this invention. Again, the capsule wall material is inert with respect to the contents of the capsule. Generally, the dye or ink comprises a liquid oil of a viscosity to act as an ink vehicle and dye materials are dissolved therein. Examples of the liquid oil are toluene, petroleum distillate, perchloroethylene, xylene, petroleum fractions and chlorinated diphenyls. Specific examples of dyes or pigments that can be employed are found in *The Chemical Formulary*, Editor-in-Chief H. Bennett, D. Van Nostrand Company, Inc., Copyright 1935, Volume II, pages 252–269. If desired, more than one marking liquid can be employed.

In the process of this invention, both wax and encapsulated marking liquid are thoroughly dry blended. Generally, the capsules range in size from 10 to 500 microns and the wax particles range in size from 1 to 100 microns. Preferably, the capsules range in size from 10 to 100 microns and the wax particles range in size from 1 to 50 microns. The dry blended mixture then is placed into a mold generally having the shape of a hollow tube and fitted with a piston at each end. After the mold is three-fourths full with the mixture, the pistons are fitted into place and a pressure ranging from 25 to 125 psi is applied to both pistons simultaneously for several seconds. With the pistons in place, the entire assembly is heated at a temperature ranging from 50° to 100° C. for about 5 to 15 minutes. Preferably, mild pressure in the above-mentioned range is applied to the pistons during heating. The assembly is chilled when molding is completed.

The combination of dry blending followed by mild pressure and heating produces excellent bonding between the wax and capsule. The combination of steps allows for a crayon of high capsule content, thereby providing a high liquid yield while still maintaining a relatively rigid crayon.

The advantages of this invention are further illustrated by the following examples. The reactants and the proportions and other specific conditions are presented as being typical and should not be construed to limit the invention unduly.

EXAMPLE I

In the preparation of the encapsulated marking liquid, the internal phase of the capsule was prepared by dissolving 1.8 grams of Plasto Blue RDA (Allied Chemical Company) and 1.8 of Hysol Blue B 200 (Morton Chemical Company) in 121.4 grams of Texanolisobutyrate while maintaining a temperature of 55° C.

This mixture was emulsified in 120 ml of 10 percent gelatin solution to a drop size ranging from 10 to 80 microns with a peak at approximately 50 microns. After the addition of 480 ml of water at 55° C., the pH was adjusted to 6.5. A mixture of 2 grams of resorcinol, 6 ml of 2 percent polyethylene maleic anhydride (grade No. 21, pH 7.0) and 6 ml of polyethylene maleic anhydride (grade No. 31, pH 7.0) in 30 ml of water then was added dropwise to the mixture. After slowly cooling to 10° C. over a period of 2 to 3 hours, the pH was adjusted to 5.5 with 14 percent Acetic Acid. Six milliliters of 25 percent gluteraldehyde was slowly added and the mixture was stirred for 2 hours. After the addition of 250 ml of water and addition of 30 ml of 37 percent formaldehyde, the pH was adjusted to 2.0 with alkyl naphthalene sulphonic acid (Neomerpin N). The pH was lowered further to 1.5 with 10 percent sulfuric acid. A mixture of 5 grams of resorcinol and 6 grams of urea dissolved in 50 ml of water was added dropwise and stirring continued for 90 minutes. This last addition and stirring was repeated and the pH then was adjusted to 5.5 with saturated sodium carbonate solution. The final particles of encapsulated marking liquid was filtered as dry as possible, dried on a fluid bed dryer at 120 degrees F, and sieved through a 125 micron screen.

EXAMPLE II

The capsules of Example I and a wax mixture were thoroughly dry blended. The dry blended mixture contained 60 weight percent capsules and 40 weight percent wax. The wax mixture contained 40 weight percent hydrogenated fatty acid (Hydrex 440 — Harchem), 30 weight percent branched chain hydrocarbon wax (XL-200 — Hoechet Wax) and 30 weight Rock FT Wax, International Wax & Refining Co. (Fischer Tropsch Wax — m.p. 93° C.). Preferably, all components of the wax mixture are melted and spray chilled to a particle size of 1 to 50 microns. The dry blended wax was placed into a hollow tube approximately three-eighths inches inside diameter and 5 inches long. The mold was three-fourths filled with the capsule-wax mixture and each end was fitted with a piston. Similtaneously, 100 psi of pressure was applied to each piston for a few seconds. With the pistons in place, the mold then was heated to 75° C. for 10 minutes. Several times during the heating cycle, 50 psi of pressure was applied to each piston. The assembly then was chilled.

The resulting crayon had the proper balance of fluidity, lubricity and strength. A high liquid yield was obtained through a high capsule content while maintaining a relatively rigid crayon.

Although this invention has been described in considerable detail, it must be understood that such detail is for the purpose of illustration only and that many variations and modifications can be made by one skilled in the art without departing from the scope and spirit thereof.

What is claimed is:

1. A process for producing a crayon comprising the steps of:
   a. dry blending wax particles ranging in size from 1 to 50 microns with capsules of an encapsulated marking liquid ranging in size from 10 to 100 microns wherein the resulting mixture contains 20 to 40 weight percent wax and 60 to 80 weight percent encapsulated marking liquid;
   b. enclosing the resulting mixture in a mold and applying to the mold a pressure ranging from 25 to 125 psi;
   c. heating the mold at a temperature ranging from 50° to 100° C. for a time ranging from 5 to 15 minutes wherein the encapsulated marking liquid has capsule walls at least partially consisting of hydrophilic colloid material and the marking liquid is a colorless, but colorable liquid, a liquid dye or an ink.

* * * * *